(12) United States Patent
Frattini et al.

(10) Patent No.: US 7,542,539 B2
(45) Date of Patent: Jun. 2, 2009

(54) APPARATUS AND METHOD FOR ULTRASONICALLY CLEANING IRRADIATED NUCLEAR FUEL ASSEMBLIES

(75) Inventors: Paul L. Frattini, Los Altos, CA (US); Robert Douglas Varrin, Reston, VA (US); Edwin Stephen Hunt, Arlington, VA (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

(21) Appl. No.: 10/014,619

(22) Filed: Dec. 10, 2001

(65) Prior Publication Data

US 2002/0163990 A1 Nov. 7, 2002

Related U.S. Application Data

(62) Division of application No. 09/545,354, filed on Apr. 7, 2000, now Pat. No. 6,396,892.

(60) Provisional application No. 60/128,391, filed on Apr. 8, 1999.

(51) Int. Cl.
*G21C 19/42* (2006.01)

(52) U.S. Cl. .................. 376/308; 376/305; 376/310; 134/1

(58) Field of Classification Search .......... 376/308, 376/305, 310, 309, 252, 316, 306; 134/1
See application file for complete search history.

(56) References Cited

U.S. PATENT DOCUMENTS

| | | | | |
|---|---|---|---|---|
| 3,290,224 A | * | 12/1966 | Martin | 376/454 |
| 3,368,946 A | * | 2/1968 | Jenssen | 376/443 |
| 3,658,643 A | * | 4/1972 | Spenke | 376/172 |
| 3,793,832 A | * | 2/1974 | Moon | 376/318 |
| 3,941,654 A | * | 3/1976 | Tarasuk et al. | 376/352 |
| 4,071,376 A | * | 1/1978 | McNeer | 134/1 |
| 4,244,749 A | | 1/1981 | Sachs et al. | |
| 4,320,528 A | * | 3/1982 | Scharton et al. | 376/310 |
| 4,372,787 A | * | 2/1983 | Fields et al. | 134/1 |
| 4,375,991 A | | 3/1983 | Sachs et al. | |
| 4,595,419 A | | 6/1986 | Patenaude | |
| 4,645,542 A | * | 2/1987 | Scharton et al. | 134/1 |
| 4,683,109 A | | 7/1987 | Cooper, Jr. et al. | |
| 4,691,724 A | | 9/1987 | Garcia et al. | |
| 4,806,277 A | | 2/1989 | Sakurai et al. | |

(Continued)

FOREIGN PATENT DOCUMENTS

FR 2642889 A1 8/1990

(Continued)

OTHER PUBLICATIONS

Hilgert, "Specifying an Ultrasonic Cleaning System," Metal Finishing, Apr. 1997.*

(Continued)

*Primary Examiner*—Rick Palabrica
(74) *Attorney, Agent, or Firm*—Kilpatrick Stockton LLP

(57) ABSTRACT

An apparatus for cleaning an irradiated nuclear fuel assembly includes a housing adapted to engage a nuclear fuel assembly. A set of ultrasonic transducers is positioned on the housing to supply radially emanating omnidirectional ultrasonic energy to remove deposits from the nuclear fuel assembly.

16 Claims, 10 Drawing Sheets

U.S. PATENT DOCUMENTS

| | | | |
|---|---|---|---|
| 4,847,037 A * | 7/1989 | Scharpenberg et al. | 376/245 |
| 4,847,042 A | 7/1989 | Musiol et al. | |
| 4,966,177 A * | 10/1990 | John, Jr. et al. | 134/61 |
| 5,000,906 A * | 3/1991 | Ellingson et al. | 376/261 |
| 5,062,965 A * | 11/1991 | Bernou et al. | 210/748 |
| 5,098,644 A * | 3/1992 | McDaniels | 376/261 |
| 5,118,464 A | 6/1992 | Richardson et al. | |
| 5,200,666 A * | 4/1993 | Walter et al. | 310/323.01 |
| 5,337,446 A * | 8/1994 | Smith et al. | 15/21.1 |
| 5,377,237 A * | 12/1994 | Richardson et al. | 376/252 |
| 5,467,791 A * | 11/1995 | Kato et al. | 134/166 C |
| 5,661,766 A * | 8/1997 | McClelland et al. | 376/245 |
| 5,812,621 A * | 9/1998 | Takeda et al. | 376/171 |
| 6,290,778 B1 * | 9/2001 | Zugibe | 134/1 |
| 6,342,747 B1 * | 1/2002 | Lee et al. | 310/228 |
| 6,396,892 B1 * | 5/2002 | Frattini et al. | 376/308 |
| 6,572,709 B1 * | 6/2003 | Kaneda et al. | 134/1 |
| 6,718,002 B2 * | 4/2004 | Rosengren et al. | 376/316 |

FOREIGN PATENT DOCUMENTS

| | | |
|---|---|---|
| IT | 0 418 722 A1 * | 3/1991 |
| JP | 354073474 A | 6/1979 |
| JP | 142385 A * | 6/1993 |
| JP | 7-120578 * | 5/1995 |
| JP | 9220545 * | 8/1997 |

OTHER PUBLICATIONS

Atomic Energy Control Board, "Fundamentals of Power Reactors, Module One, Science & Engineering Fundamentals," pp. 9 and 10, 1995 (copyright notice 1993).*

International Search Report mailed Jul. 31, 2000 corresponding to PCT/US00/09336.

Written Opinion mailed Jun. 18, 2001 corresponding to PCT/US00/09336.

* cited by examiner

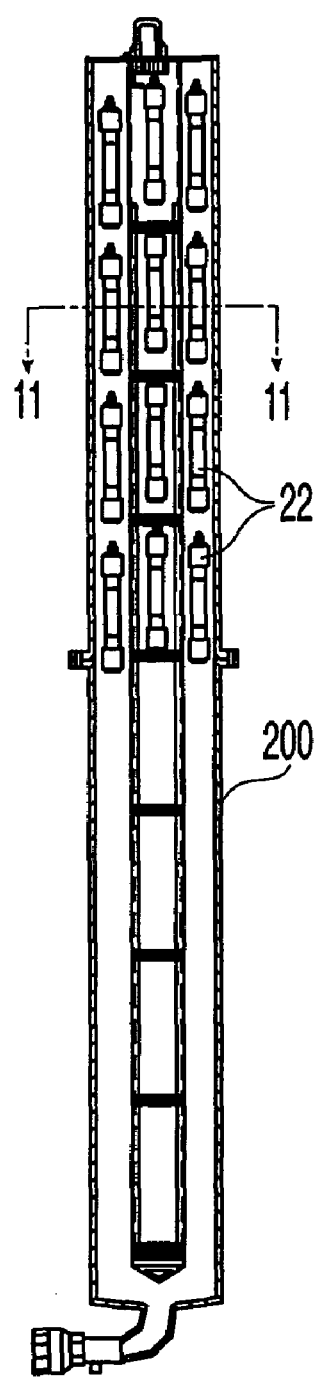
Fig. 10
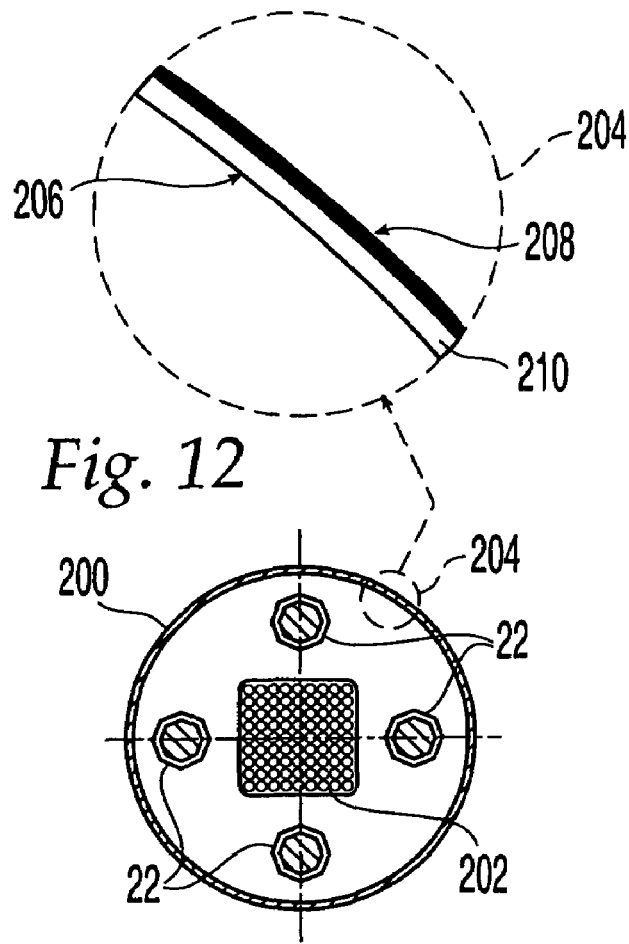
Fig. 12
Fig. 11

APPARATUS AND METHOD FOR ULTRASONICALLY CLEANING IRRADIATED NUCLEAR FUEL ASSEMBLIES

This is a division of application no. 09/545,354, filed Apr. 7, 2001 now U.S. Pat. No. 6,396,392.

This application claims priority to the provisional patent application entitled, "Apparatus and Method for Ultrasonically Cleaning Irradiated Nuclear Fuel Assemblies", Ser. No. 60/128,391, filed Apr. 8, 1999.

BRIEF DESCRIPTION OF THE INVENTION

This invention relates generally to the maintenance of nuclear power plants. More particularly, this invention relates to a technique for ultrasonically cleaning irradiated nuclear fuel assemblies of nuclear power plants.

BACKGROUND OF THE INVENTION

During operation of a nuclear power reactor, impurities and products of the reactor coolant are deposited on nuclear fuel assemblies. These deposits can impact operation and maintenance of nuclear power plants in a number of ways; for example, (a) their neutronic properties can adversely affect the nuclear performance of the reactor; (b) their thermal resistance can cause elevated surface temperature on the fuel rods that may lead to material failure in the rod; (c) their radioactive decay results in work radiation exposure when they are redistributed throughout the reactor coolant system, in particular during power transients; (d) they complicate thorough inspection of irradiated nuclear fuel assemblies by both visual and eddy current methods; (e) deposits released from fuel rods tend to reduce visibility in the spent fuel pool, significantly delaying other work in the fuel pool during refueling outages; (f) once reloaded into the reactor on assemblies that will be irradiated a second or third time, they form an inventory of material that can be redistributed onto new fuel assemblies in a detrimental manner. Currently, methods to efficiently and cost-effectively remove such deposits from irradiated nuclear fuel assemblies are lacking other than slow, manual techniques.

Recently, axial offset anomaly (AOA) has been reported in pressurized water reactors (PWRs). AOA is a phenomenon in which deposits form on the fuel rod cladding due to the combination of local thermal-hydraulic conditions and primary-side fluid impurities characteristic of the reactor and the primary system. These deposits act as a poison to the nuclear reaction and cause an abnormal power distribution along the axis of the core, reducing available margin under certain operating conditions. AOA has forced some power plants to reduce the reactor power level for extended periods.

The problem of AOA has necessitated the development of an efficient, cost-effective mechanism for removing PWR fuel deposits. Such a mechanism is also desirable to reduce total deposit inventory to lower dose rates for plant personnel, to improve fuel inspectability, to prepare fuel for long-term dry storage, and to facilitate the collection of crud samples for analysis.

Several approaches have been proposed to remove PWR fuel deposits. One method is to chemically clean assemblies in situ in the reactor, or after being removed to a separate cleaning cell. There are several problems with this approach, including cost, potential for corrosion by the cleaning chemicals, and the difficulty of disposing of the resultant highly contaminated chemicals. Perhaps the greatest shortcoming of this chemical approach is that it is time consuming, requiring several hours to clean a single fuel assembly.

Another approach being pursued is circulation of ice chips in a cleaning cell where the flow of ice past the fuel rods would gently remove deposits. There are concerns with this approach, including cleaning effectiveness, the difficulty of driving ice chips through certain fuel support structures, the need to create large volumes of ice chips, the effect of low temperatures on the structural integrity of the fuel rods, and the dilution of Boron in the spent fuel pool.

In the past, individual fuel rods and fuel channels have been cleaned by conventional ultrasonics during the manufacturing process. However, conventional ultrasonics would not be very effective in cleaning large bundles of fuel rods in irradiated fuel assemblies due to the low power density per unit volume that can be produced. Furthermore, the conventional ultrasonic cleaning transducers are large and therefore difficult to implement in a typical plant fuel pool.

In view of the foregoing, it would be highly desirable to provide a time-efficient, effective, low-cost technique to remove deposits from irradiated nuclear fuel assemblies.

SUMMARY OF THE INVENTION

The invention includes an apparatus for cleaning an irradiated nuclear fuel assembly. The apparatus includes a housing to engage a nuclear fuel assembly. A set of ultrasonic transducers is positioned on the housing to supply radially emanating omnidirectional ultrasonic energy to remove deposits from the nuclear fuel assembly.

The method of the invention is directed toward cleaning an irradiated nuclear fuel assembly. The method includes the step of positioning a nuclear fuel assembly adjacent to a housing. Radially emanating omnidirectional ultrasonic energy is then supplied from transducers positioned on the housing to the nuclear fuel assembly to remove deposits from the nuclear fuel assembly.

BRIEF DESCRIPTION OF THE DRAWINGS

For a better understanding of the invention, reference should be made to the following detailed description taken in conjunction with the accompanying drawings, in which:

FIGS. 10-12 illustrate an ultrasonic cleaning apparatus for use in connection with Boiling Water Reactors.

DETAILED DESCRIPTION OF THE INVENTION

Figure 1:
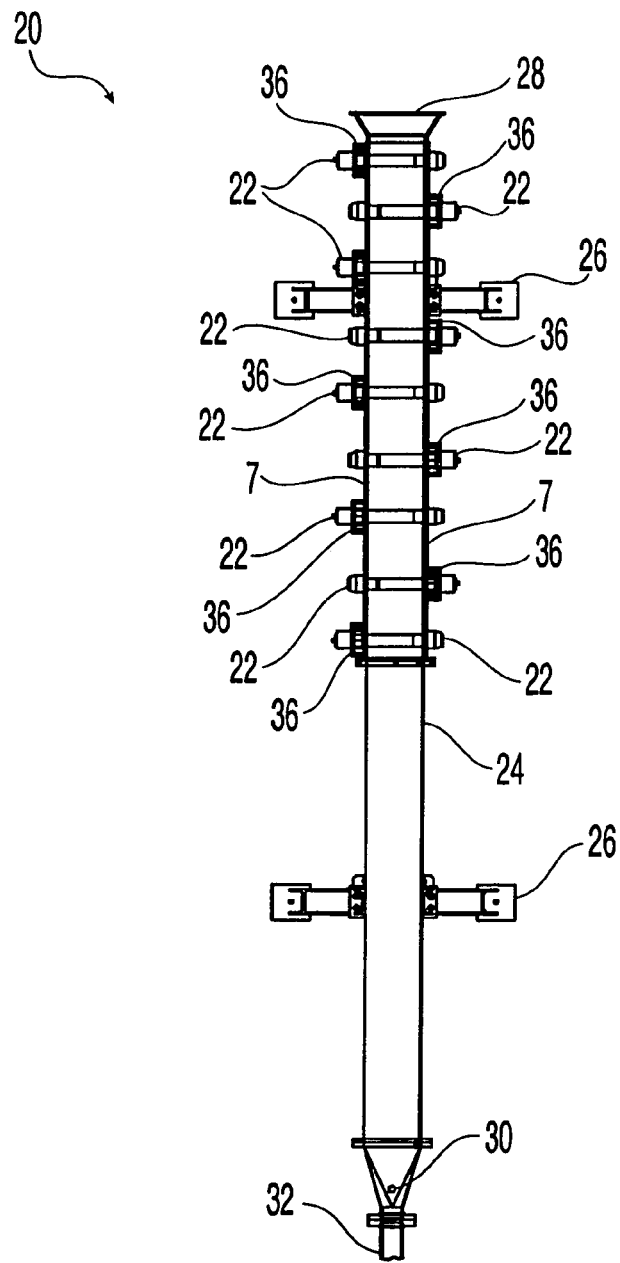
FIG. 1 is a front view of an ultrasonic cleaning apparatus constructed in accordance with an embodiment of the invention.

FIG. 1 is a front view of an ultrasonic cleaning apparatus 20 constructed in accordance with an embodiment of the invention. The apparatus 20 includes ultrasonic transducers 22 mounted on a housing 24. A guide 28 is positioned at the top of the housing 24. A nuclear fuel assembly (not shown in FIG. 1) is passed through the guide 28 and into the housing 24. Once the nuclear fuel assembly is positioned within the housing 24, it is cleaned through the application of ultrasonic energy from the ultrasonic transducers 22, as discussed further below.

Assembly reaction supports 26 may be used to mount the housing 24 to a wall of a cleaning pool. Alternately, the housing 24 may be supported by a crane or hoist. FIG. 1 also illustrates filtration piping 32 and an emergency cooling hole 30, for use in the event that the filtration system fails. The emergency cooling hole 30 provides sufficient decay heat removal from the fuel channel through natural convection in the event of equipment failure (e.g., loss of pumps). Filtration piping 32 is used to send water laden with removed deposits to a filtration unit, as discussed below.

The transducers 22 may be mounted on transducer mounting plates 34. The transducer mounting plates 34 are used to connect the transducers 22 to the housing 24. Transducer spacers 36 are used to mount the transducers 22 to the mounting plates 34 in the proper position.

Figure 2:
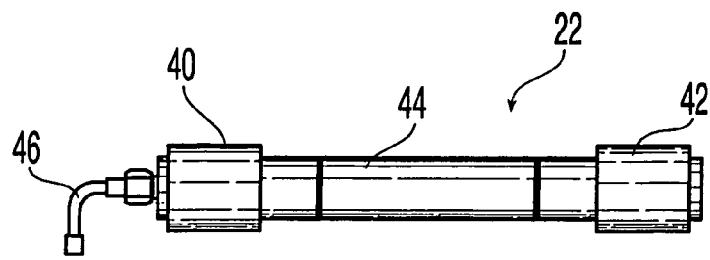
FIG. 2 illustrates an ultrasonic transducer used in accordance with an embodiment of the invention to produce radially emanating omnidirectional energy.

FIG. 2 illustrates a transducer 22 used in accordance with the invention. The transducer 22 includes a first piezoelectric transducer or stack of transducers 40 and a second piezoelectric transducer or stack of transducers 42 mounted on opposite sides of a rod 44. The transducers 40 and 42 receive controlling signals over line 46. The configuration of the transducer 22 produces radial pressure waves emanating from the rod 44 in all directions. Thus, the radially emanating pressure waves are referred to as omidirectional.

The omnidirectional pressure waves utilized in accordance with the invention stand in contrast to conventional ultrasonic transducers that produce uni-directional pressure waves in the liquid in which they vibrate. The unidirectional wavefronts are nominally planar, being produced by the motion of a planar structure, like the wall or bottom of an ultrasonic bath, to which the transducer is attached. The transmitted energy dissipates as it encounters physical objects. Thus, in the case of fuel rods of a fuel assembly, it is difficult to use conventional ultrasonics, since it is difficult to drive the ultrasonic energy all the way into the center of the fuel assembly. The required energy to accomplish this is excessive and could possibly cause damage to the fuel.

The transducers 22 of the invention produce omnidirectional pressure waves. The wavefronts are produced by the phase-locked motion of the two piezoelectric transducers 40 and 42. Cylindrically produced pressure waves spaced such that their node structure along the bar axis is approximately equivalent to the fuel rod spacing or a multiple of the fuel rod spacing can more easily penetrate the rows of fuel rods. Therefore, cleaning of the interior rods within the fuel bundle can be accomplished with much lower energy input than would be required if such interior cleaning were to be obtained using conventional ultrasonics. In other words, the transducers, the offset positioning, and their reflectors operate to produce a space-filling energy field that has sufficient energy in the fuel assembly interior to clean the deposits from the most highly screened fuel rod quickly, without transmitting so much energy to a fuel rod that cladding motion physically damages fuel pellets.

The invention has been implemented using PUSH-PULL transducers sold by Martin Walter Ultraschalltechnik, GMBH, Staubenhardt, Germany. These transducers are described in U.S. Pat. No. 5,200,666, which is incorporated by reference herein. Ultrasonic frequencies between 20 kHz and 30 kHz and transducer power between 1,000 and 1,500 Watts have proven successful. This has produced an energy density between 20-30 Watts/gallon, which is a particularly effective energy density to remove deposits from an irradiated fuel assembly. This energy density is believed to be significantly lower than the energy density realized during the use of conventional ultrasonic transducers.

Other transducers that may be used to produce radially emanating omnidirectional energy in accordance with the invention include telsonic radiator (tube) transducers and sonotrode transducers (with a transducer on a single side of a rod).

In one embodiment, the transducer body 44 is formed of titanium and stainless steel endcaps are used. The gaskets, cabling, and connectors associated with the device should be configured for operation within a Spent Fuel Pool and must otherwise meet all typical compatibility requirements and safety requirements (e.g., Foreign Material Exclusion, or FME, requirements in the fuel handling area) customary in nuclear power plants.

Figure 3:
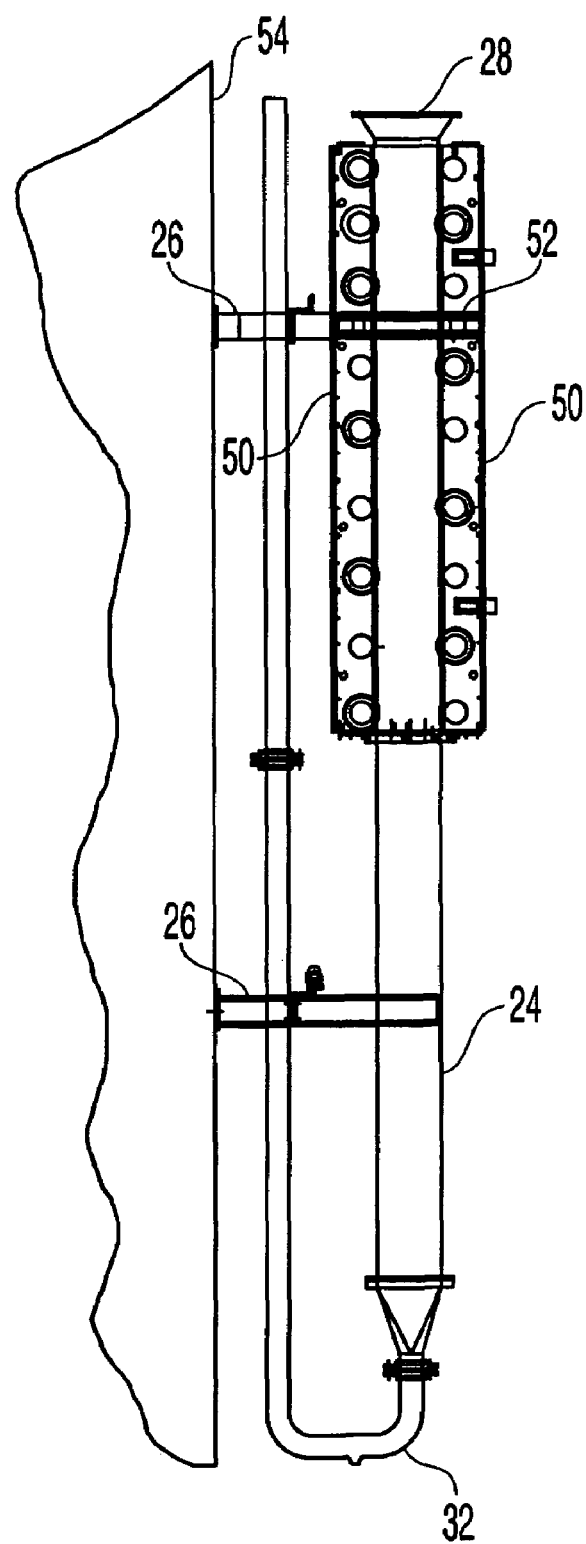
FIG. 3 is a side view of the ultrasonic cleaning apparatus of FIG. 1.

FIG. 3 is a side view of the apparatus 20 of FIG. 1. FIG. 3 illustrates the fuel channel or housing 24, the assembly reaction support 26, the guide 28, filtration piping 32, reflectors 50, and an assembly mounting beam 52. The reflectors 50 are used to increase the amount of ultrasonic energy that is delivered to the fuel assembly. That is, the reflectors 50 operate to reflect ultrasonic energy into the fuel assembly. The assembly mounting beams 52 are used to connect the transducer mounting plates 34 to the assembly reactor supports 26. The assembly reactor supports 26 press against the wall 54 of a fuel pool where cleaning takes place, as discussed below.

The housing 24, mounting plates 34, spacers 36, and reflectors 50 may be formed of stainless steel. Other materials may be used if they meet general safety and materials compatibility requirements typical for operating nuclear power plants. In particular, the selected material should be compatible for use in the fuel storage and handling areas of a plant, including the Spent Fuel Pool and Cask Loading Pit.

Preferably, the interior surfaces of the housing 24 are electro-polished to reduce the opportunity for radioactive particles to deposit on these surfaces or lodge on pits or crevices in these surfaces. This enables the housing to be disassembled and shipped without personnel radiation exposure. Observe that the ultrasonic transducers 22 can be used to clean the housing 24. That is, the transducers 22 are activated when the housing 24 is empty to clean the walls of the housing 24 of deposits.

Figure 4:
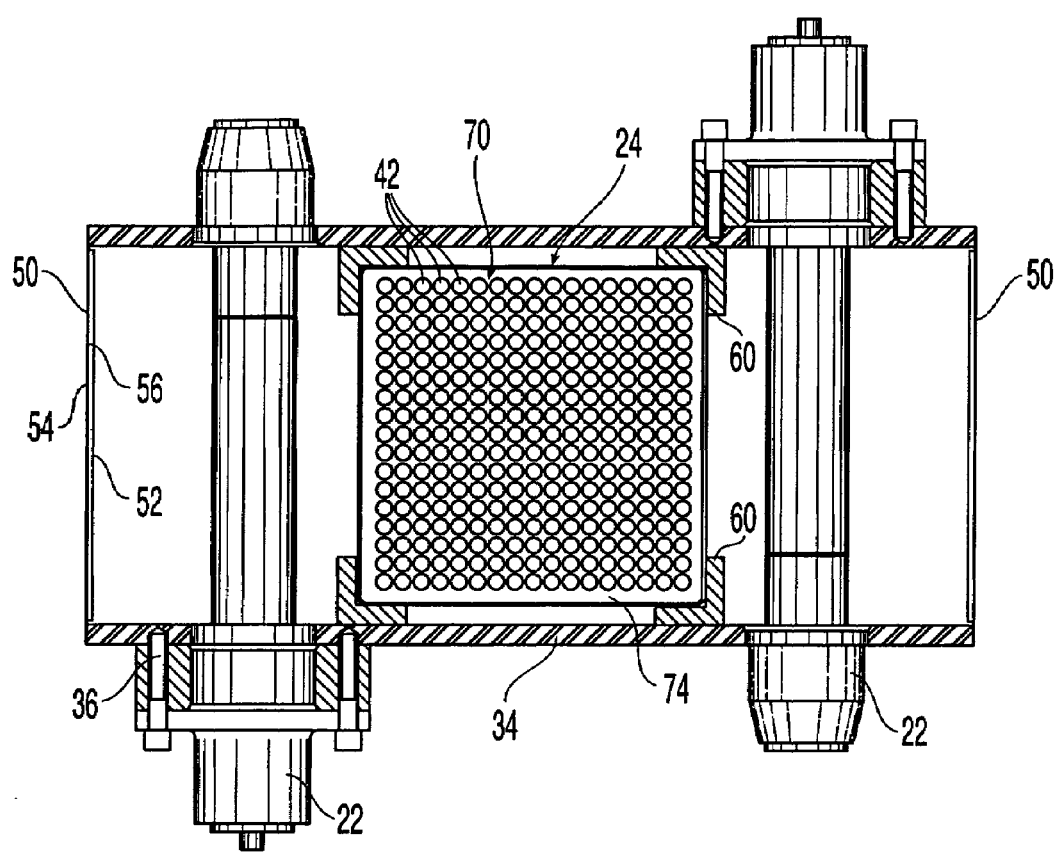
FIG. 4 is a plan view of the ultrasonic cleaning apparatus of FIG. 1 with a nuclear fuel assembly positioned inside it.

FIG. 4 is a plan view of the ultrasonic cleaning apparatus 20. FIG. 4 clearly illustrates the following previously disclosed components: the transducers 22, the housing 24, the transducer mounting plates 34, the transducer spacers 36, and the reflectors 50. The figure also illustrates housing spacers 60, which operate to allow ultrasonic energy to pass into the two sides of the apparatus that do not face transducer arrays. Each reflector 50 includes an interior reflector surface 56 and an outer surface 54 separated by an air gap 56. This configuration has proved to be particularly effective in reflecting the ultrasonic energy.

FIG. 4 also illustrates a fuel assembly 70 positioned within the housing 24. The fuel assembly 70 includes individual fuel rods 72. Deposits 74 are shown adhering to the fuel rods 72. Deposits of this type are removed in accordance with the invention.

FIG. 4 illustrates a 17×17 fuel assembly 70. The housing 24 may be configured to accept all designs of Light Water Reactor Fuel. Naturally, the housing may also be implemented for alternate fuel sources.

The apparatus of FIGS. 1-4 provides high-energy-density ultrasonics to remove tightly adherent deposits from irradiated nuclear fuel assemblies. In particular, the transducers 22 produce a power density and sonic field to penetrate into the center of the fuel bundle 70 so as to clean fuel rod cladding located there. The transducers 22 are installed (axes oriented horizontally) in vertical arrays along two sides of the fuel assembly (e.g., as shown in FIG. 1). FIG. 1 illustrates transducers 22 at the top of the housing 24 because this corresponds to the position of deposits in most Pressurized Water Reactors. Naturally, the transducers 22 may be positioned along the entire length of the housing 24 or at limited strategic locations.

The fuel rods within an assembly 70 typically number over 200 and are arranged in a square pitch array (e.g., 17×17). On a candidate assembly for cleaning, the cladding housing the fuel pellet stack is covered with deposits, which are to be removed. For each vertical array of transducers, adjacent transducers are offset in the lateral direction, such that the nodes on one transducer (i.e., points undergoing zero displacement for the excited mode shape) are aligned with the points of maximum displacement on the adjacent transducers above and below during system operation. In addition, each transducer is offset axially in this manner from the one located on the opposite side of the fuel assembly. In other words, it is desirable to position the transducers for half wave offset (or multiples thereof) along the axis of facing transducers. This positioning significantly improves penetration of the tube bundle.

Figure 5:
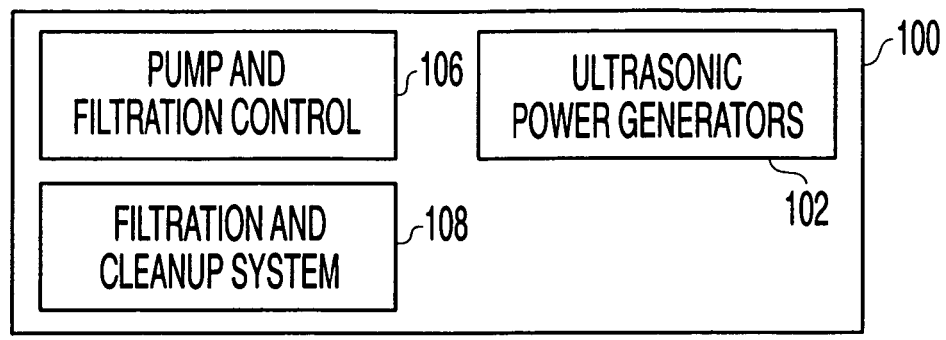
FIG. 5 illustrates the ultrasonic cleaning apparatus of FIG. 1 and associated pump and filtration equipment used in accordance with an embodiment of the invention.
Figure 5:
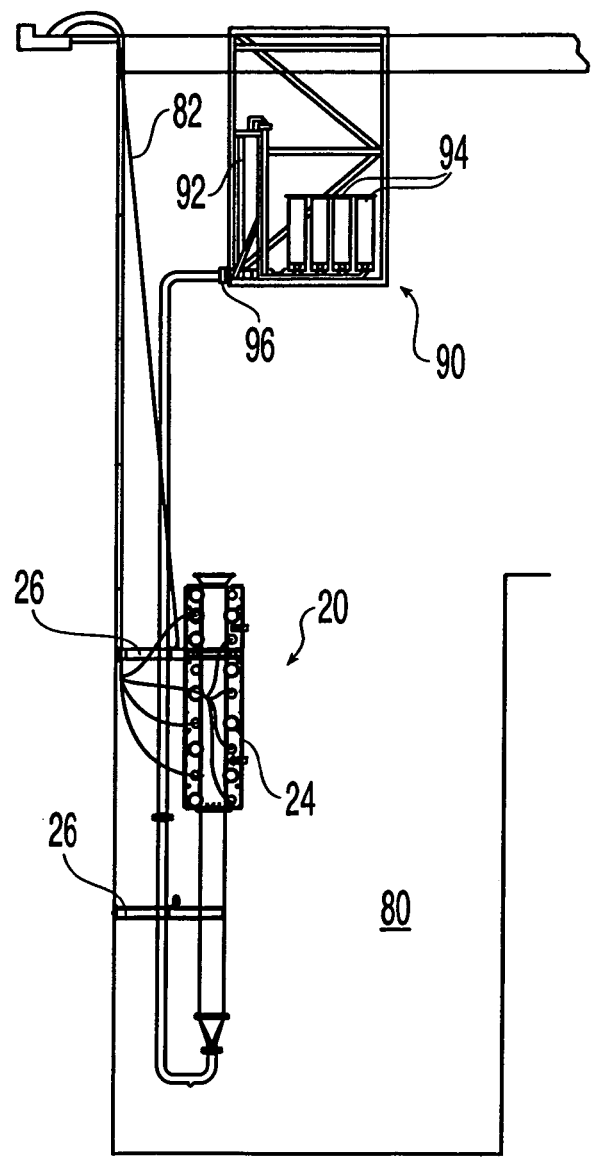

FIG. 5 illustrates the apparatus of the invention 20 positioned in a fuel pool 80. The apparatus 20 is mounted using the assembly reaction supports 26. A cable 82 may also be used to support the apparatus 20. The apparatus 20 has an associated pump and filtration assembly 90. The assembly 90 includes at least one pump 92 and a set of filters 94. Preferably, a radiation sensor 96 is positioned at the entry point to the pump. The radiation sensor 96 is used to determine when the fuel assembly is clean. In particular, when the gamma activity at the sensor 96 drops to a baseline value, it is known that no more fuel deposit particles are being removed and therefore cleaning is complete.

FIG. 5 also illustrates ancillary control equipment 100 associated with embodiments of the invention. The equipment 100 may include ultrasonic power generators 102, pump and filtration control circuitry 106, and a filtration and cleanup system 108.

Figures 6A, 6B, 6C:
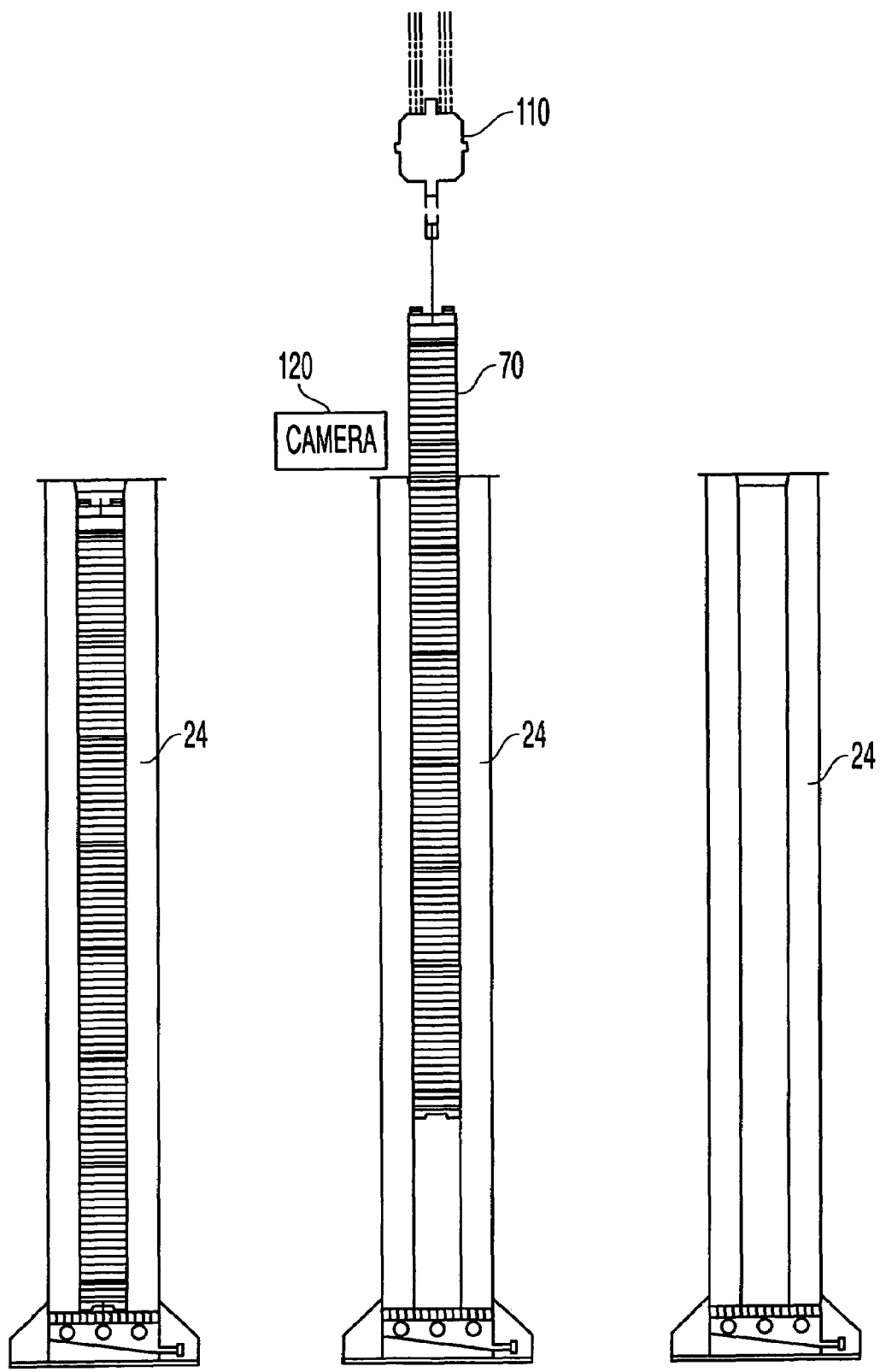
FIGS. 6(a)-6(c) illustrates the process of positioning a fuel assembly within the housing of the invention.

FIGS. 6(a)-6(b) illustrate the positioning of a fuel assembly 70 into a simplified depiction of the housing 24. The fuel assembly 70 is positioned through the use of a hoist 110. In FIG. 6(a) the fuel assembly 70 is within the housing 24. In FIG. 6(b) the fuel assembly 70 is partially removed from the housing 24. In FIG. 6(c) the fuel assembly 70 is removed from the housing 24. The hoist 110 of FIGS. 6(a)-6(b) may be used in the system of FIG. 5 to insert and remove a fuel assembly 70 from the pool 80. The hoist 110 may also be used to reposition the fuel assembly 70 during ultrasonic cleaning, so as to clean different areas along the axial length of the fuel assembly 70.

Once a fuel assembly 70 is positioned within the housing 24, ultrasonic cleaning commences. Successful results have been achieved using omnidirectional radial ultrasonic waves operating at a frequency of between approximately 20 and 30 kHz and a transducer power between 1,000 and 1,500 Watts. As appreciated with reference to FIG. 5, the pump 92 draws water through the fuel assembly, thereby flushing the deposits which are removed by the ultrasonic energy produced by the transducers 22. Providing a downward flow through the housing 24 eliminates the need for sealing the top of the housing 24.

Preferably, the fuel assembly 70 is supported at all times by the hoist 110 so that the housing 24 never actually supports the weight of the fuel assembly 70 during the cleaning process. As previously disclosed, the transducers 22 are mounted on the outside of the housing 24 such that the ultrasonic energy passes through the housing walls. Testing has demonstrated that the primary effect of the intervening housing walls is attenuation of the low-frequency portion of the ultrasonic signal. The high-frequency portion of the ultrasonic signal (i.e., frequencies greater than 10 kHz), responsible for the majority of the cleaning effectiveness, passes through a properly designed housing with little attenuation.

A typical cleaning sequence in accordance with the invention is as follows. The fuel hoist 110 picks up a fuel assembly 70 from a fuel storage rack. Mobile machinery associated with the hoist 110 transports the fuel assembly 70 to the pool 80 or some other cleaning station. Preferably, the fuel assembly 70 is video taped as it is inserted into the housing 24. By way of example, FIG. 6(b) illustrates a camera 120 positioned at the top of housing 24 to video the fuel assembly 70. The transducers 22 are then energized. Preferably, the hoist 110 is used to jog the assembly 70 up and then down, on two minute intervals (i.e., up for two minutes, down for two minutes . . . ). Each jog excursion is preferably approximately several inches.

Gamma radiation activity is monitored with sensor 96. The water with radioactive fuel deposit particles is pumped by the pump 92 through the filters 94 and is then returned to the pool 80. The total radioactivity of the filters 94 is preferably monitored. Once the gamma activity at the sensor 96 drops back to baseline, it is known that no more fuel deposit particles are being removed and therefore cleaning is complete. The typical cleaning sequence is between 7-10 minutes. This stands is stark contrast to prior art chemical approaches that last for hours. The cleaning sequence time associated with the invention can be reduced by increasing the transducer power. Existing experimental evidence suggests that increased transducer power will not damage the fuel pellets.

After cleaning, the fuel assembly 70 is removed from the housing 24, while being video taped. Video tape from before and after cleaning may be studied to confirm the success of the process.

The hoist 110 then moves the fuel assembly 70 to the fuel storage rack. The cleaning system is now ready to accept the next fuel assembly 70 for cleaning. Observe that in the case of a strongly supported housing 24, a single hoist 110 may be used to load a set of ultrasonic cleaning devices 20. Such a configuration enhances overall throughput.

The technique of the invention was successfully demonstrated on 16 once-irradiated fuel assemblies that were processed in accordance with the invention during a refueling outage. The cleaned assemblies were then reloaded for subsequent irradiation in the reactor. The fuel assemblies were monitored for signs of degrading pellet integrity and for signs that fuel deposits that cause Axial Offset Anomaly might not have been sufficiently cleaned off. The most serious stress to the pellets occurs during the reactor start-up ramp. There was no indication of adverse effects on the pellets during restart, and no adverse effects have been subsequently observed during continuous reactor operation. In addition, neutron flux maps indicate that the fuel deposits in the most critical areas under the assembly grids were sufficiently removed such that the assembly is performing like new fuel, without indication of anomalous flux depressions.

In addition to demonstrating the effectiveness of the invention in the field, the invention has also successfully withstood a variety of laboratory tests. In particular, a series of experiments was performed with samples of air-oxidized Zircaloy fuel cladding. In particular, a laboratory mock-up of a 17×17 fuel rod assembly was tested. The tests demonstrated no metallurgical damage to the cladding oxide as a result of extended exposure to the ultrasonic cleaning of the invention. This test indicates that the fuel cladding (the cylindrical metal wall containing the fuel pellets that in combination constitute the fuel rod) will not be affected adversely by exposure of the fuel assemblies to the ultrasonic cleaning process.

The ultrasonic cleaning technique of the invention can clean without imparting potentially damaging force on the fuel pellets. The ultrasonic waves utilized in accordance with the invention do not penetrate the gas gap typically found between the pellet and the interior surface of the cladding, so that the only means of transmitting harmful vibrational energy to the pellets is by motion of the cladding interior surface against the pellets. Experimental results demonstrate that the vibration spectrum of the cladding is comparable to the vibration spectrum experienced by the fuel during operation. That the harmful vibrations are bounded by typical operating conditions in the reactor would not be expected to hold true for conventional ultrasonics, since the much higher energy input required to clean the interior rods within the fuel bundle could be expected to be harmful to the pellets.

Those skilled in the art will appreciate that the invention may be implemented in a variety of configurations. By way of example, additional embodiments are shown in FIGS. 7-10.

Figure 7:
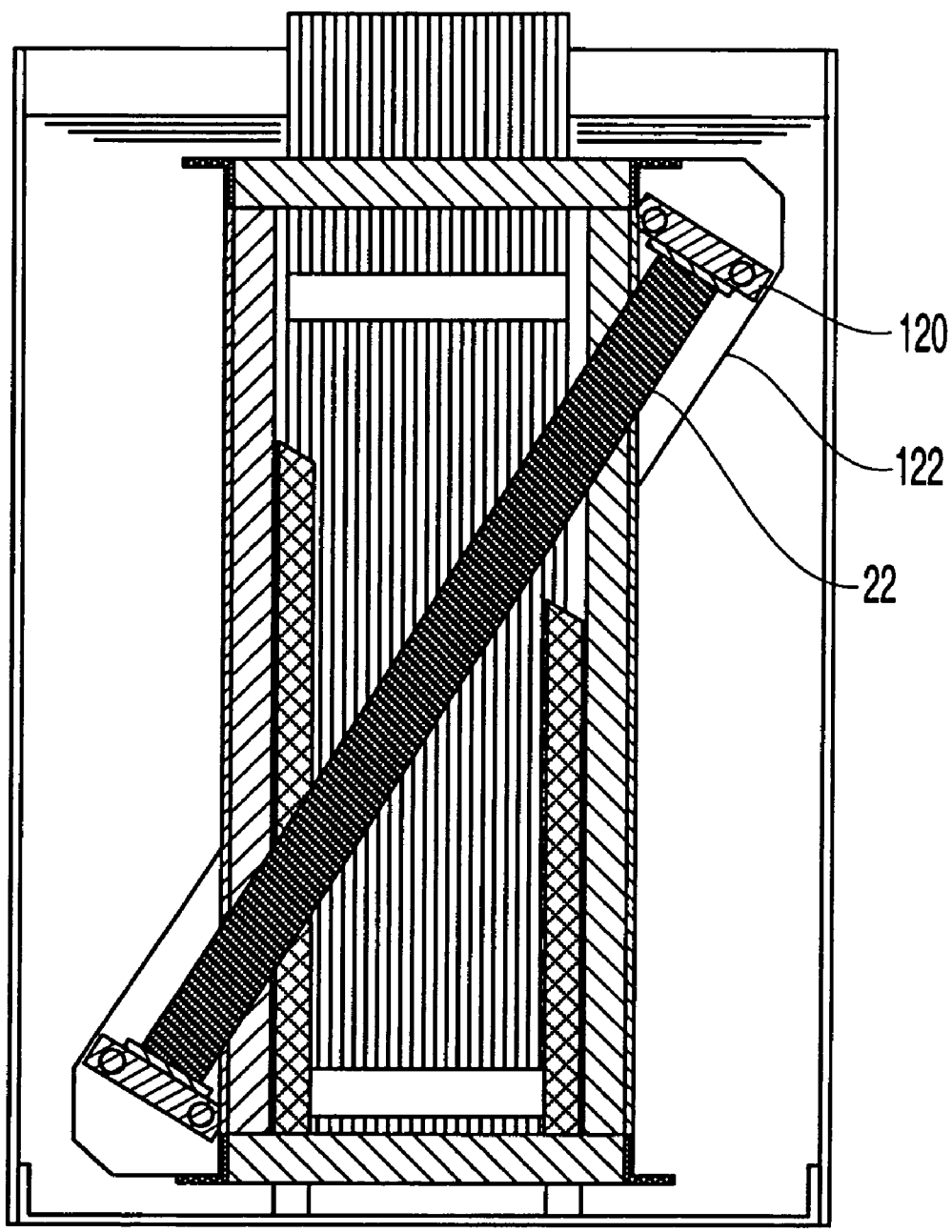
FIG. 7 illustrates an embodiment of the invention using diagonally positioned ultrasonic transducers.

FIG. 7 illustrates the transducer 22 of the invention oriented at 45° in a vertical plane, rather than horizontally, as in the previous embodiments. The transducer 22 may be positioned within a mounting block 120 of a mounting bracket 122. By way of example, the apparatus of FIG. 7 may be mounted at the top of the housing 24 of FIGS. 6(a)-6(c). In this embodiment, the fuel assembly 70 is raised and lowered past the transducers during the cleaning process, as shown in FIGS. 6(a)-6(c).

It should be noted that the invention can be implemented with transducers on all four sides of a housing 24. Such embodiments include reflectors for each transducer.

Figures 8A, 8B:
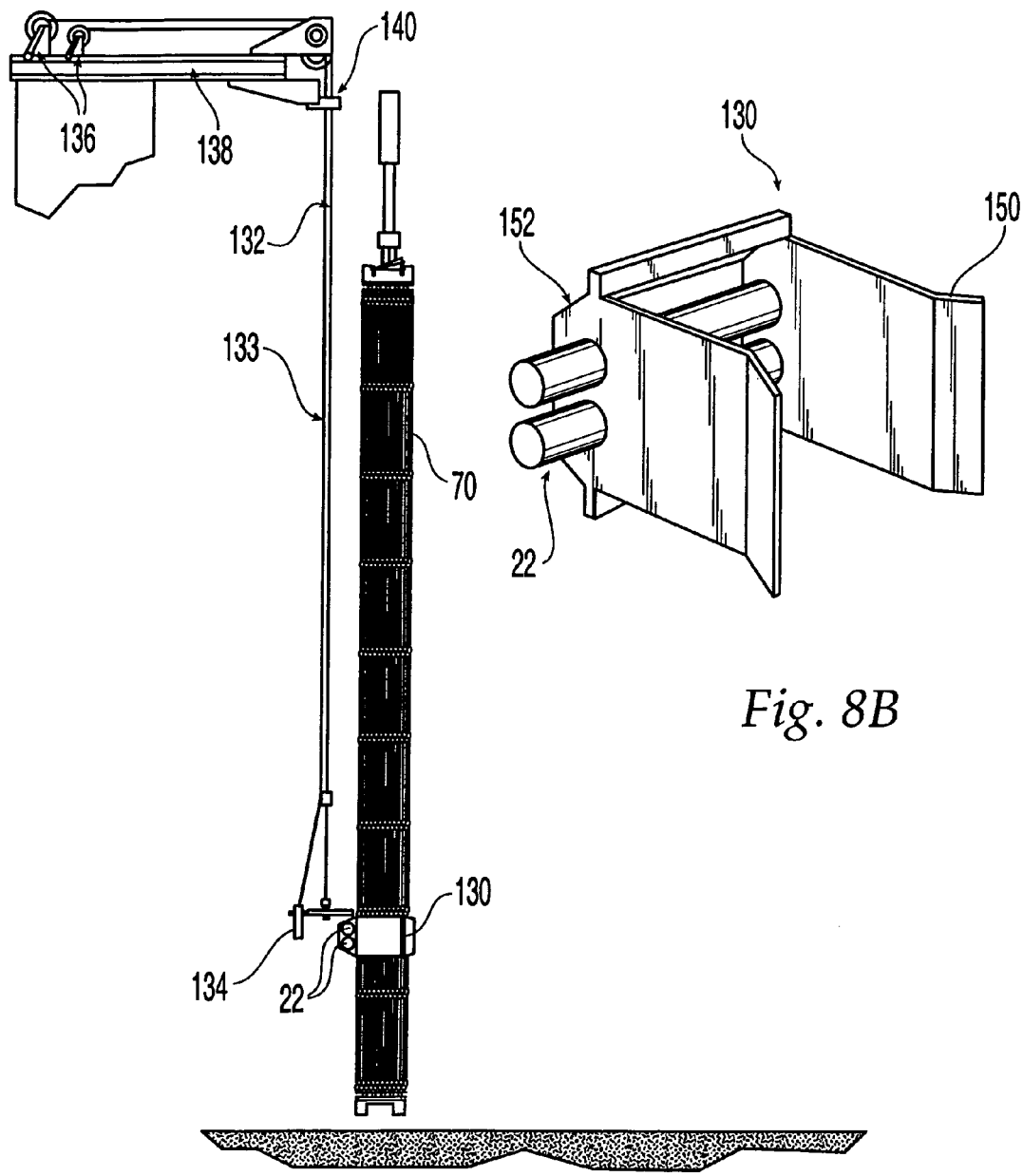
FIGS. 8(a)-8(b) illustrate a mobile ultrasonic cleaning apparatus in accordance with an embodiment of the invention.

FIG. 8(a) illustrates an embodiment of the invention in which transducers 22 are mounted on a housing 130 that is raised and lowered during the cleaning process, while the fuel assembly 70 remains stationary. This embodiment of the invention demonstrates that the housing 130 need not surround the fuel assembly. In the embodiment of FIGS. 1-5 the housing 24 operates to protect the fuel, improve filtration and cooling, and contain the removed deposits. The housing may also operate to simply support the ultrasonic transducers, as shown in FIG. 8a.

The housing 130 of FIG. 8a is attached to a lift cable 132. A counter weight 134 is used to counter balance the weight of the housing 130. The counter weight 134 is attached to a leveling cable 133. The lift cable 132 is moved by hoists 136, which are positioned on a support beam 138. A brake 140 may be used to control the motion of the housing 130.

FIG. 8(b) is a detailed illustration of the housing 130. In this embodiment, the housing 130 mounts the transducers 22 in a guide 150, which has an associated reflector 152.

Figure 9:
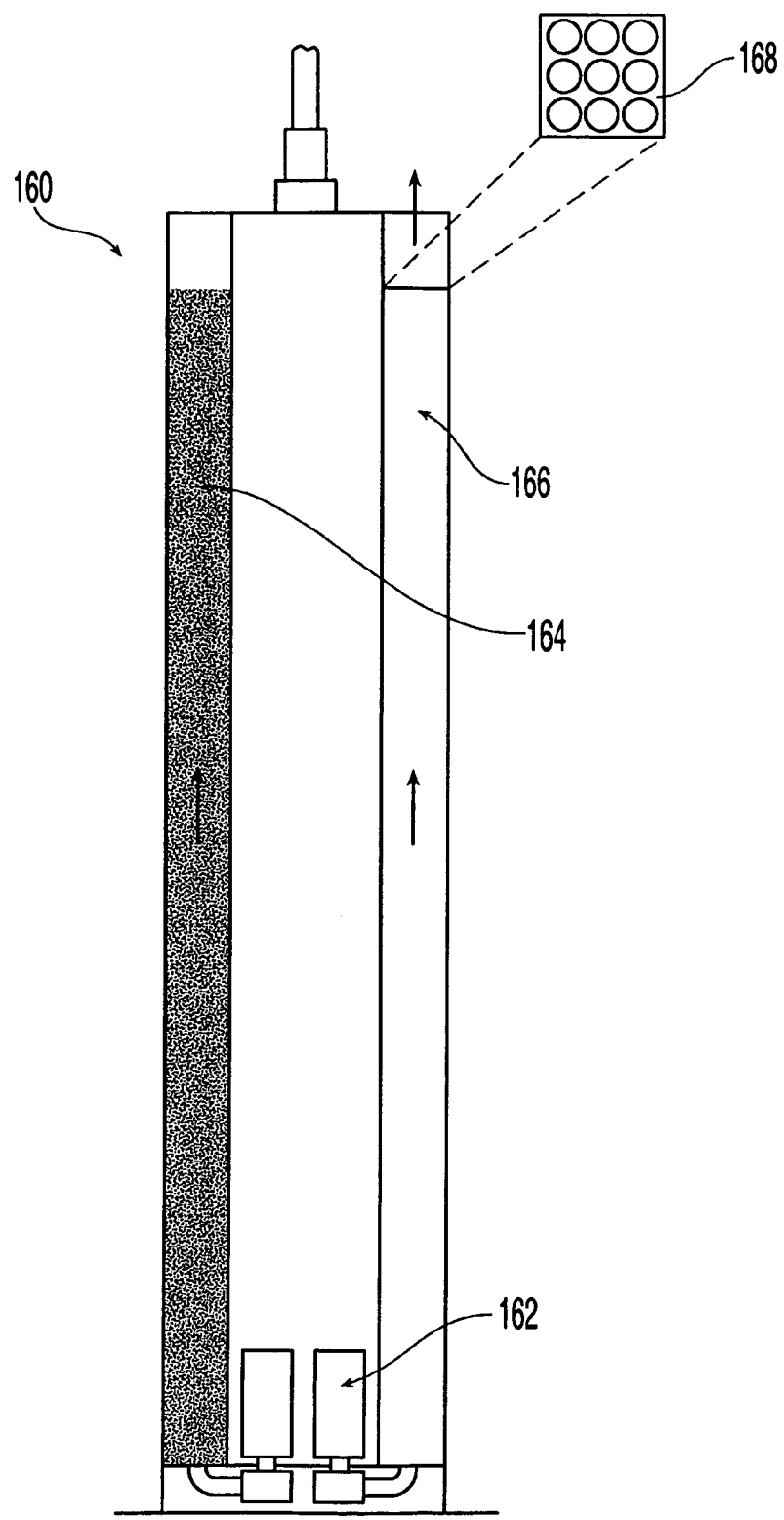
FIG. 9 illustrates the ultrasonic cleaning apparatus of the invention with an integral pump and filtration system.

FIG. 9 illustrates a channel 160 for receiving an ultrasonic cleaning apparatus of the invention and an associated fuel assembly. The channel 160 includes an integral pump 162 and integral filters 164 and 166. Thus, in this embodiment, a single integrated system provides both the cleaning and filtration functions. Filter 164 may be a coarse filter for internal circulation, while filter 166 may be a fine filter to exhaust to a fuel pool during final cleaning. Block 168 illustrates that the fine filter 166 may be implemented with a matrix of pleated filters (e.g., nine two inch pleated filters).

Figure 13:
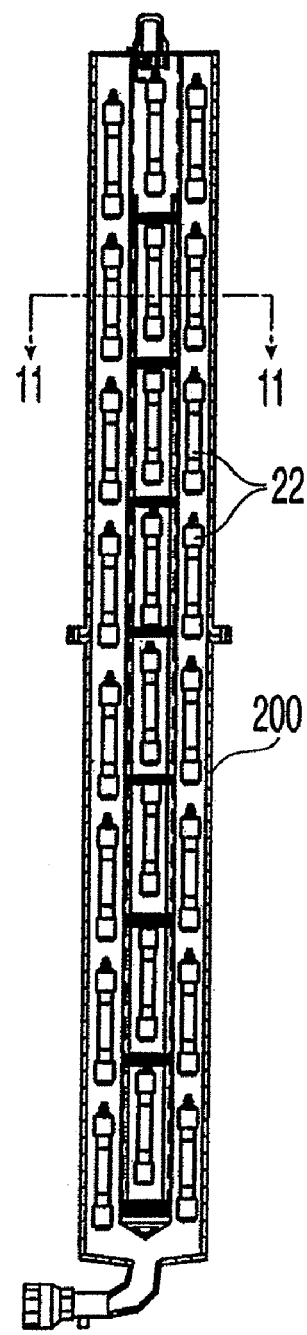

FIGS. 10-13 illustrate an embodiment of the invention for use with Boiling Water Reactors. In particular, FIG. 10 illustrates an apparatus for cleaning channeled fuel used in connection with Boiling Water Reactors without dechanneling the fuel assembly. FIG. 10 illustrates a housing 200 which supports a set of vertically mounted transducers 22. As shown in FIG. 13, the transducers may span the entire axial length of the housing 200.

FIG. 11 is a top view of the housing 200 taken along the line 11-11 of FIG. 10. FIG. 11 illustrates the vertically mounted transducers 22 surrounding a fuel assembly 202. Preferably, the housing 200 includes a reflector 204. FIG. 12 illustrates a reflector 204, including an inner reflecting surface 206 and an outer surface 208. An air gap 210 is positioned between the inner reflecting 206 surface and the outer surface 208.

Those skilled in the art will appreciate that the invention provides a time-efficient, effective, compact, low-cost technique to remove deposits from nuclear fuel assemblies. The technique of the invention is extremely fast compared to prior art chemical approaches.

The invention also allows a fuel assembly to be cleaned without disassembling it. The technique of the invention does not produce adverse cladding displacements that would otherwise threaten the physical integrity of irradiated fuel pellets. In other words, the invention can clean interior deposits in a fuel assembly without any consequence during the subsequent reactor re-start.

Another significant benefit associated with the invention relates to improved radiation management and reduced radiation exposure for plant personnel. The fuel deposit particles removed by the cleaning process are in fact the same radioactive material which, when distributed about the coolant loop as a result of thermal/hydraulic transients in the core, cause the most significant personnel does during outages. Thus, by cleaning the fuel and bottling up the radioactive particulate on filters, which themselves may be safely stored in the fuel pool for long periods of time (while their activity decays), one can achieve reductions in outage dose rate and personnel dose. Hence, fuel cleaning as a strategy for dose rate control and dose rate reduction is a viable new method for reducing radiation management costs.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

The invention claimed is:

1. An apparatus configured to clean an assembled irradiated nuclear fuel assembly having multiple fuel rods, the apparatus comprising:
   an elongated housing having an opening at a first end and a length, wherein said opening is configured to receive, and said length is configured to be at least as long as, said assembled irradiated nuclear fuel assembly; and
   a plurality of ultrasonic omnidirectional transducers positioned on said housing, each comprising;
   a first end;
   a second end; and
   a rod disposed between said first end and said second end, said rod configured to emanate omnidirectional ultrasonic energy waves;
   wherein said first end and said second end are attached to said elongated housing.

2. The apparatus of claim 1, wherein said plurality of ultrasonic omnidirectional transducers is positioned along the entire length of said housing.

3. The apparatus of claim 1, wherein said rod of each of said plurality of ultrasonic omnidirectional transducers comprises an elongated rod positioned substantially parallel to the length of said housing.

4. The apparatus of claim 3, wherein said plurality of ultrasonic omnidirectional transducers is positioned along the entire length of said housing.

5. The apparatus of claim 1, wherein said housing is configured to receive an irradiated boiling water reactor nuclear fuel assembly.

6. The apparatus of claim 1, wherein said elongated housing further comprises a reflector that comprises:
   a cylindrical inner reflecting surface positioned around a periphery of said housing; and
   a cylindrical outer reflecting surface positioned around a periphery of said cylindrical inner reflecting surface and forming a gap between said cylindrical inner reflecting surface and said cylindrical outer reflecting surface.

7. An apparatus configured to clean an assembled irradiated nuclear fuel assembly having multiple fuel rods, the apparatus comprising:
   an elongated housing configured to receive said assembled irradiated nuclear fuel assembly; and
   a plurality of ultrasonic omnidirectional transducers positioned on said elongated housing, each comprising;
   a first end;
   a second end; and
   a rod disposed between said first end and said second end, said rod configured to emanate omnidirectional ultrasonic energy waves having a node structure that is an approximate multiple of a spacing between the fuel rods of said assembled irradiated nuclear fuel assembly;
   wherein said first end and said second end are attached to said elongated housing.

8. The apparatus of claim 7, wherein said approximate multiple is one.

9. The apparatus of claim 7, wherein said elongated housing further comprises a reflector that comprises:

a cylindrical inner reflecting surface positioned around a periphery of said elongated housing; and
a cylindrical outer reflecting surface positioned around a periphery of said cylindrical inner reflecting surface and forming an air gap between said cylindrical inner reflecting surface and said outer reflecting surface.

10. An apparatus configured to clean an assembled, four-sided irradiated nuclear fuel assembly having multiple fuel rods, the apparatus comprising:
   an elongated housing to receive said assembled irradiated nuclear fuel assembly;
   a plurality of ultrasonic omnidirectional transducers, wherein each comprises a rod configured to emanate omnidirectional ultrasonic energy waves and further wherein:
   a first subset of said plurality of ultrasonic omnidirectional transducers is positioned on said elongated housing and configured to be adjacent to a first side of said assembled irradiated nuclear fuel assembly;
   a second subset of said plurality of ultrasonic omnidirectional transducers is positioned on said elongated housing and configured to be adjacent to a second side of said assembled irradiated nuclear fuel assembly;
   a third subset of said plurality of ultrasonic omnidirectional transducers is positioned on said elongated housing and configured to be adjacent to a third side of said assembled irradiated nuclear fuel assembly; and
   a fourth subset of said plurality of ultrasonic omnidirectional transducers is positioned on said elongated housing and configured to be adjacent to a fourth side of said assembled irradiated nuclear fuel assembly;
   wherein said elongated housing comprises a reflector comprising;
   a cylindrical inner reflecting surface positioned around a periphery of said elongated housing; and
   a cylindrical outer reflecting surface positioned around a periphery of said cylindrical inner reflecting surface and forming an air gap between said cylindrical inner reflecting surface and said cylindrical outer reflecting surface.

11. The apparatus of claim 10, wherein the length of said elongated housing extends in a first direction and further wherein the length of each of said plurality of ultrasonic omnidirectional transducers is positioned substantially parallel to said first direction.

12. An apparatus configured to clean an assembled irradiated nuclear fuel assembly having multiple fuel rods, the apparatus comprising:
   a housing having a first end and a second end, wherein the housing has an opening at the first end and a length that is defined between the first end and the second end, wherein said opening is configured to receive, and said length is configured to be at least as long as, said assembled irradiated nuclear fuel assembly; and
   a plurality of ultrasonic transducers positioned on said housing, each comprising a rod configured to emanate omnidirectional ultrasonic energy waves having a node structure that is an approximate multiple of a spacing between the fuel rods of said assembled irradiated nuclear fuel assembly.

13. The apparatus of claim 12, wherein said plurality of ultrasonic omnidirectional transducers is positioned along an entirety of said length of said housing.

14. The apparatus of claim 12, wherein said approximate multiple is one.

15. The apparatus of claim 12, wherein said housing further comprising a reflector that comprises:

a cylindrical inner reflecting surface positioned around a periphery of said stationary housing; and a cylindrical outer reflecting surface positioned around a periphery of said inner reflecting surface, in which an air gap is positioned between said inner reflecting surface and said outer reflecting surface.

16. The apparatus of claim 7, wherein each of said plurality of ultrasonic omnidirectional transducers is configured to emanate ultrasonic energy waves with a period equal to an approximate multiple of the spacing between the fuel rods of said assembled irradiated nuclear fuel assembly.

* * * * *